(12) United States Patent
Pierce et al.

(10) Patent No.: US 10,375,123 B2
(45) Date of Patent: Aug. 6, 2019

(54) SYNCHRONOUS COMMUNICATION SESSION COORDINATION AND HANDLING AMONG DEVICES USING METADATA

(71) Applicant: Samsung Electronics Co., Ltd., Gyeonggi-do (KR)

(72) Inventors: Jeffrey S. Pierce, Sunnyvale, CA (US); Mike Digman, Mountain View, CA (US); Selene A. Mota Toledo, Palo Alto, CA (US)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 176 days.

(21) Appl. No.: 15/267,767

(22) Filed: Sep. 16, 2016

(65) Prior Publication Data

US 2017/0171253 A1    Jun. 15, 2017

Related U.S. Application Data

(60) Provisional application No. 62/267,807, filed on Dec. 15, 2015.

(51) Int. Cl.
*G06F 15/16* (2006.01)
*H04L 29/06* (2006.01)
*H04L 12/18* (2006.01)

(52) U.S. Cl.
CPC ...... *H04L 65/1069* (2013.01); *H04L 12/1818* (2013.01); *H04L 65/1059* (2013.01); *H04L 65/1096* (2013.01)

(58) Field of Classification Search
CPC ............. H04L 12/1818; H04L 65/1059; H04L 65/1069; H04L 65/1096
See application file for complete search history.

(56) References Cited

U.S. PATENT DOCUMENTS

| | | |
|---|---|---|
| 7,342,917 B2 | 3/2008 | Mohan et al. |
| 8,195,177 B2 | 6/2012 | Willey |
| 8,320,891 B1 | 11/2012 | Delker et al. |
| 8,335,530 B2 | 12/2012 | Chaudry et al. |
| 8,644,886 B1 | 2/2014 | Delaney et al. |
| 8,670,534 B2 | 3/2014 | Abramskiehn et al. |
| 8,943,159 B1 | 1/2015 | D'Agruma et al. |
| 2003/0112952 A1 | 6/2003 | Brown et al. |

(Continued)

FOREIGN PATENT DOCUMENTS

| | | |
|---|---|---|
| KR | 20070104120 | 10/2007 |
| KR | 20080006660 | 1/2008 |
| KR | 20140081495 | 7/2014 |

OTHER PUBLICATIONS

WIPO Int'l. Appln. PCT/KR2016/014157, International Search Report and Written Opinion, dated Mar. 14, 2017, 11 pg.

(Continued)

*Primary Examiner* — Mohamed A. Wasel
(74) *Attorney, Agent, or Firm* — Cuenot, Forsythe & Kim, LLC (57) ABSTRACT

In some embodiments, a request for a communication session is sent, from a requesting device to a recipient device, prior to establishing the communication session with the recipient device. A reply to the request is received, within the requesting device, from the recipient device. Responsive to the reply, the communication session is scheduled within the requesting device based upon the reply.

18 Claims, 5 Drawing Sheets

(56) References Cited

U.S. PATENT DOCUMENTS

| | | | |
|---|---|---|---|
| 2005/0020249 A1* | 1/2005 | Seo | H04M 1/663 |
| | | | 455/414.1 |
| 2009/0003585 A1* | 1/2009 | Chen | H04M 3/20 |
| | | | 379/268 |
| 2009/0022297 A1* | 1/2009 | Jackson | G06Q 10/109 |
| | | | 379/210.01 |
| 2009/0093240 A1 | 4/2009 | Lang | |
| 2009/0296904 A1 | 12/2009 | Brewer et al. | |
| 2010/0246785 A1* | 9/2010 | Wang | H04M 1/72583 |
| | | | 379/88.23 |
| 2010/0246791 A1* | 9/2010 | Wang | H04M 3/42195 |
| | | | 379/201.02 |
| 2010/0273447 A1* | 10/2010 | Mann | H04M 1/72519 |
| | | | 455/405 |
| 2011/0071878 A1* | 3/2011 | Gingras | G06Q 10/109 |
| | | | 705/7.18 |
| 2011/0151852 A1 | 6/2011 | Olincy et al. | |
| 2012/0040644 A1 | 2/2012 | Naik et al. | |
| 2012/0184256 A1 | 7/2012 | Wang | |
| 2013/0003953 A1 | 1/2013 | Okubo | |
| 2013/0148646 A1 | 6/2013 | Efrati et al. | |
| 2013/0324093 A1 | 12/2013 | Santamaria et al. | |
| 2014/0036733 A1* | 2/2014 | Teng | G06Q 10/109 |
| | | | 370/260 |
| 2014/0057610 A1 | 2/2014 | Olincy et al. | |
| 2014/0093058 A1 | 4/2014 | Larson | |
| 2014/0179361 A1 | 6/2014 | Kotreka et al. | |
| 2014/0205076 A1 | 7/2014 | Kumar et al. | |
| 2015/0281441 A1* | 10/2015 | Kelly | H04M 3/493 |
| | | | 379/88.01 |
| 2015/0350448 A1 | 12/2015 | Coffman et al. | |
| 2016/0014271 A1 | 1/2016 | Dave et al. | |
| 2016/0014272 A1 | 1/2016 | Koch et al. | |

OTHER PUBLICATIONS

EP Application 16875958.7, Office Action, dated Apr. 5, 2019, 10 pg.

KR Application 1020187017887, Office Action, dated Feb. 28, 2019, 4 pg.

* cited by examiner

| Initiating Caller Name |
| ☆ Urgent    ◴ Few Seconds |
| Presentation question |
| 📞      📵 |

Mom would like to talk about "Weekend plans". ◴

📞 Call      ✕ Ignore

Or send a message:
(905) (910) (915) ○○○

○ I'll call in
○ Call me in   ⊖ 15 ⊕ minutes

○ Can't talk but can message
○ Need a minute to exit a meeting
○ Sorry, tied up now
○ Compose custom message Go

FIG. 9

SYNCHRONOUS COMMUNICATION SESSION COORDINATION AND HANDLING AMONG DEVICES USING METADATA

CROSS-REFERENCE TO RELATED APPLICATIONS

This application claims the benefit of U.S. Provisional Patent Application No. 62/267,807 filed on Dec. 15, 2015, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to synchronous communication and, more particularly, to coordination and handling of synchronous communications between a plurality of participant devices.

BACKGROUND

A phone call is a form of synchronous communication. Like other forms of synchronous communication, in order to establish the phone call, both the calling party and the called party must be available simultaneously to participate on the call. Further, both the calling party and the called party must be willing to participate. Unfortunately, when making a phone call, the calling party is unaware of whether the called party is actually available. Similarly, the called party has limited information about the call. For example, the called party has little to no information regarding the subject of the call or how long the call is likely to last.

For these reasons, many users attempt to manually plan or schedule phone calls. The planning process, however, is often time consuming and/or tedious. In many cases, users rely upon communication channels that are not synchronous, e.g., electronic mail, texting, and so forth, to coordinate the phone call. These other communication channels are completely separate from the phone call being coordinated and are not integrated into the phone call user experience.

SUMMARY

One or more embodiments are directed to methods of communication. In one aspect, a method can include sending, from a requesting device to a recipient device prior to establishing a communication session with the recipient device, a request for the communication session and receiving, within the requesting device, a reply to the request from the recipient device. The method can also include, responsive to the reply, scheduling the communication session within the requesting device based upon the reply.

One or more embodiments are directed to apparatus for communication. In one aspect, an apparatus can include a display device, a transceiver, and a processor coupled to the display device and the transceiver. The processor can be configured to initiate operations including sending, to a recipient device and prior to establishing a communication session with the recipient device, a request to initiate the communication session and receiving a reply to the request from the recipient device. The operations can also include scheduling the communication session based upon the reply.

In another aspect, an apparatus can include a display device, a transceiver, and a processor coupled to the display device and the transceiver. The processor can be configured to initiate operations including, receiving, from a requesting device and prior to establishing a communication session with the requesting device, a request to initiate the communication session, receiving a user input indicating a response to the request, and scheduling the communication session based upon the response.

One or more embodiments are directed to computer program products including a computer readable storage medium having program code stored thereon for communication. The program code is executable by a processor to perform operations. In one aspect, the operations can include sending, from a requesting device to a recipient device prior to establishing a communication session with the recipient device, a request for communication and receiving, within the requesting device, a reply to the request from the recipient device. The operations can include, responsive to the reply, scheduling the communication session within the requesting device based upon the reply.

One or more embodiments are directed to a graphical user interface displayed on a display device. In one aspect, the graphical user interface displayed on the display device includes the display device configured to display a control user interface element that, when selected, sends from a requesting device to a recipient device prior to establishing a communication session with the recipient device, a request to establish the communication session. The display device can also be configured to display an outstanding request user interface that indicates that the request exists to establish the communication session, wherein the outstanding request user interface is adapted to disappear responsive to the communication session between the requesting device and the recipient device being established.

This Summary section is provided merely to introduce certain concepts and not to identify any key or essential features of the claimed subject matter. Many other features and embodiments of the invention will be apparent from the accompanying drawings and from the following detailed description.

BRIEF DESCRIPTION OF THE DRAWINGS

The accompanying drawings show one or more embodiments; however, the accompanying drawings should not be taken to limit the invention to only the embodiments shown. Various aspects and advantages will become apparent upon review of the following detailed description and upon reference to the drawings.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to synchronous communication and, more particularly, to coordination and handling of synchronous communications between a plurality of participant devices. One or more example embodiments provided within this disclosure provide a mechanism to coordinate and handle synchronous communications. A requesting device is capable of generating a request for synchronous communication and sending the request to a recipient device. In one aspect, the requesting device is capable of generating and/or sending the request prior to the establishment of a synchronous communication session with the recipient device. In another aspect, the requesting device is capable of generating and/or sending the request while the requesting device is initiating a synchronous communication session with the recipient device.

The request may provide any of a variety of metadata items to the recipient device. The recipient device may display or otherwise present a notification responsive to receiving the request. Metadata items included in the request may be included within the notification. The notification further may include one or more control elements that a user of the recipient device may utilize to reply to the request.

The recipient device is capable of generating a reply to the request. The recipient device may generate the reply under control of the user of the device. In one aspect, the recipient device is capable of including metadata items within the reply. One or more of the metadata items of the reply may be determined or included in the reply based upon the metadata item(s) received within the request from the requesting device. The requesting device is capable of receiving the reply and performing one or more operations in response thereto. For example, the requesting device may initiate the synchronous communication session, schedule the synchronous communication session for a later time, or the like. The particular operation(s) performed by the requesting device may be determined, at least in part, based upon the metadata item(s) from the recipient device included in the reply.

As defined herein, the term "synchronous communication session" refers to a communication link between at least two nodes or devices (e.g., a requesting device and a recipient device) that supports semi-permanent and interactive (e.g., concurrent, bi-directional) information exchange between the nodes. Examples of synchronous communication sessions (hereafter "communication sessions") include, but are not limited to, an audio call (e.g., whether mobile phone call, landline call, Voice-Over-IP (VoIP) or Internet-based audio call), a video call, and so forth. The term "call," as used herein refers to either one or both of an audio call or a video call.

Figure 1:
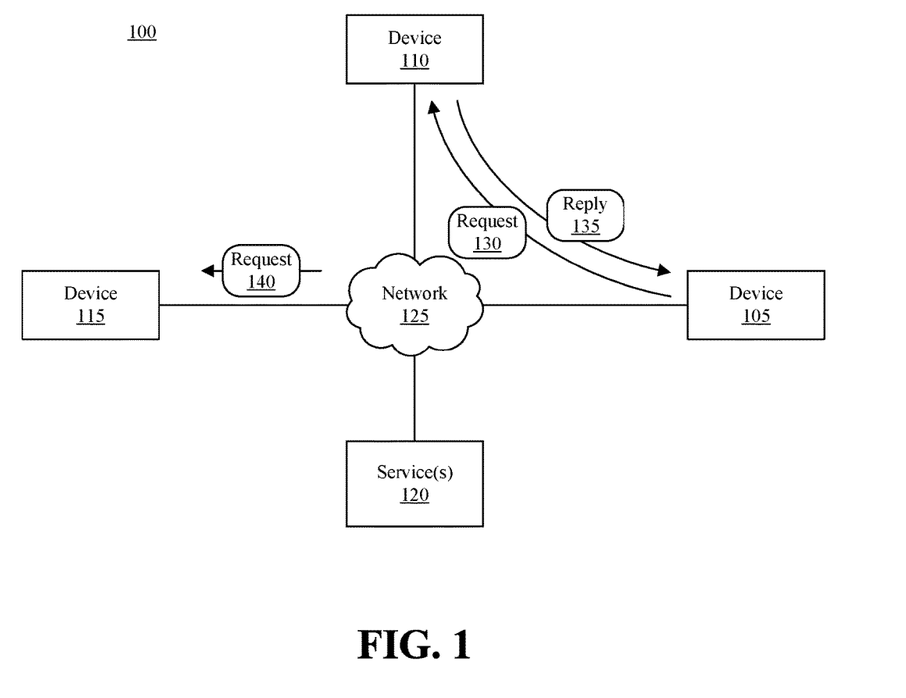
FIG. 1 illustrates an example communication platform.

FIG. 1 illustrates an example communication platform 100. Communication platform 100 includes a plurality of devices 105, 110, and 115, one or more optional services 120, and a network 125. It should be appreciated that the number of devices and/or nodes shown is for purposes of illustration and not limitation. Communication platform 100 may include additional nodes or fewer nodes as the case may be.

Devices 105, 110, and 115, and service(s) 120 are coupled to network 125. Devices 105, 110, 115, and service(s) 120 are capable of communicating through network 125. In one aspect, devices 105, 110, and 115 are implemented as communication devices (hereafter "device"). Examples of communication devices include, but are not limited to, computers (e.g., desktop, laptop, tablet computer, etc.), smart phones or other mobile devices, tablet computers, and so forth.

Service(s) 120 may be implemented as one or more data processing systems, e.g., servers, coupled to network 120. Services 120 may execute applications that provide particular operations such as speech recognition operations, natural language processing (NLP) operations, and so forth for communication sessions between devices such as devices 105, 110, and/or 115. In one or more other embodiments, service(s) 120 may include or implement one or more communication services supporting Internet based calls. For example, a particular service 120 is capable of logging users in using a login mechanism such as a username and/or password to facilitate or implement Internet-based synchronous communication.

Network 125 is the medium used to provide communication links between devices 105, 110, and/or 115, and service(s) 120. Network 125 may include connections, such as wired communication links, whether electrical or optical, and wireless communication links. Network 125 may be implemented as, or include, any of a variety of different communication technologies such as a Wide Area Network (WAN), a Local Area Network (LAN), a wireless network whether WAN or LAN, a mobile network, a Virtual Private Network (VPN), the Internet, the Public Switched Telephone Network (PSTN), and so forth.

In one or more embodiments, device 105 is capable of sending a request 130 to device 110. Request 130 requests the establishment of a communication session between device 105 and device 110 (e.g., the user of device 105 and the user of device 110). Request 130 may be sent prior to the establishment of the communication session or while a communication session is being initiated. Responsive to request 130, device 110 displays a notification for request 130. Device 110 may generate a reply 135 to request 130. Device 110 may send reply 135 to device 105. Responsive to receiving reply 135, device 105 may perform any of a variety of different operations. For example, device 105 may initiate the communication session with device 110. Device 105 may schedule the communication session for some time in the future. In another example, device 110 may initiate a communication session with device 105 in response to receiving request 130.

In another embodiment, where device 105 and device 110 are engaged in an ongoing communication session, device 105 may generate request 140 and send request 140 to device 115. Request 140 may be an invitation for the user of device 115 to join the ongoing communication session. Request 140 may specify one or more items of metadata describing the ongoing communication session to aid the user of device 115 in determining whether to join the ongoing communication session. Metadata from request 130, for example, may be recycled or reused within request 140. In one aspect, in response to request 140 and acceptance of request 140, device 115 may be joined into the ongoing communication session. In the case where the user of device 115 does not act on request 140 prior to the ongoing communication session between devices 105 and 110 ending, request 140 may be canceled. For example, device 105 or one of services 120 may send a cancellation.

In one or more embodiments, requests and replies may be communicated through a centralized service (e.g., by one or more of service(s) 120). In that case, the users and/or devices authenticate with the service. In one or more other embodiments, the conveyance of requests and/or replies may be performed using an existing data channel such as Short Message Service (SMS), and so forth. In one example, specially formatted SMS messages may be used to convey requests and/or replies. For example, a device can format a request as a text message using a template that would make the message both human-readable and machine-parseable.

In one or more embodiments, phone numbers may be used as unique identifiers. A device may assume that any metadata associated with a calling phone number is related to any temporally proximate incoming calls from that number. The incoming phone number is included automatically with SMS data and text messages, and a centralized service could require associating a phone number with a user's account. In another embodiment, requests and/or replies may be sent and received using Rich Communication Services.

In one or more other embodiments, identifiers other than phone numbers may be used. For example, in the case of an Internet based service, devices 105, 110, and 115 may log into a service using a username and password. The login may be required in order to facilitate the various operations and communications described herein.

It should be appreciated that despite the mechanism used to exchange requests and replies, the process described herein for coordinating and/or handling communication sessions may be integrated within the communication session, e.g., calling, user experience. This integration is illustrated in greater detail with reference to FIG. 3 and the various user interfaces illustrated in FIGS. 4-9.

Figure 2:
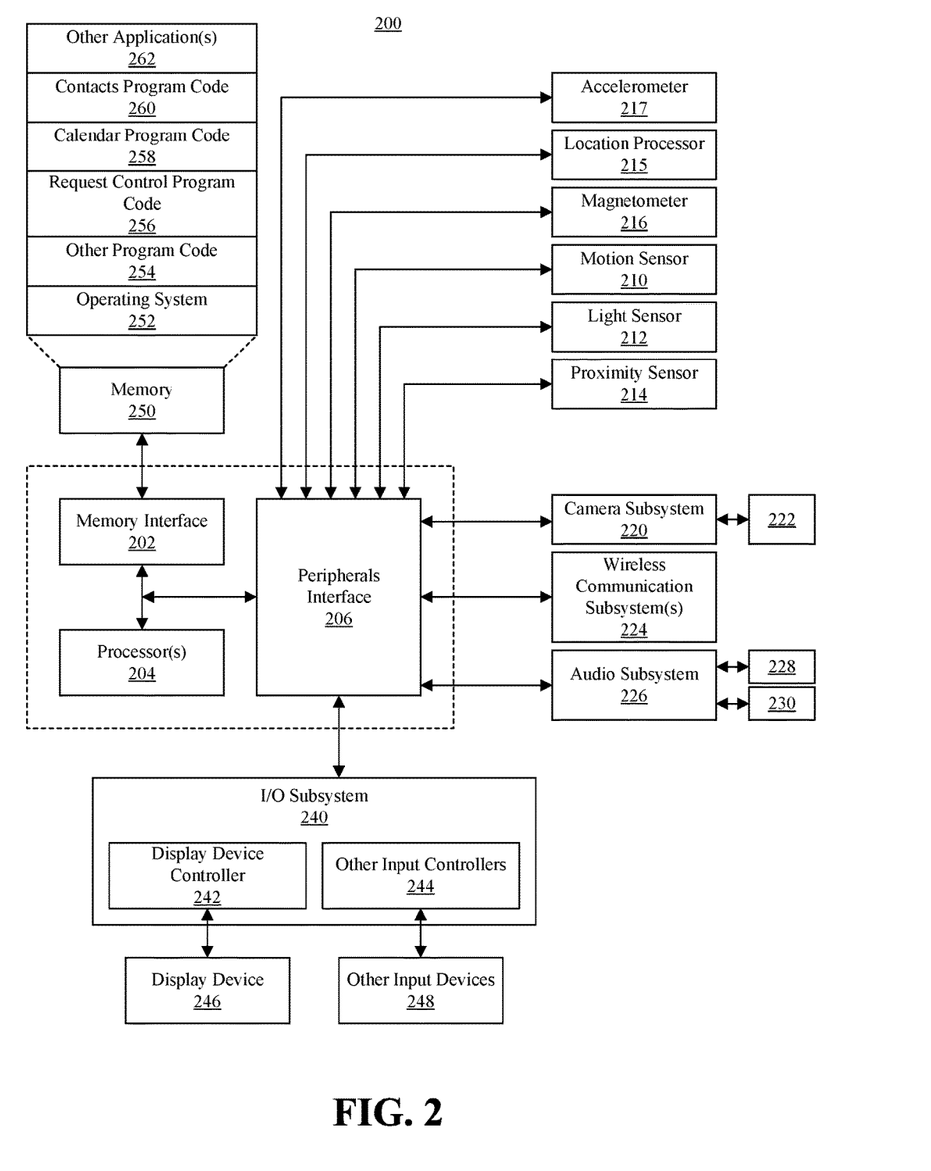
FIG. 2 illustrates an example architecture for a communication device.

FIG. 2 illustrates an example of an architecture 200 for a communication device. In one embodiment, architecture 200 is for a data processing system. For example, architecture 200 may be used to implement a mobile device, a computing system, and so forth. Architecture 200 may be used to implement device(s) 105, 110, and/or 115 of FIG. 1.

Architecture 200 can include a memory interface 202, one or more data processors, image processors and/or processors 204, and a peripherals interface 206. Memory interface 202, one or more processors 204, and/or peripherals interface 206 can be separate components or can be integrated in one or more integrated circuits. The various components in architecture 200, for example, can be coupled by one or more communication buses or signal lines.

Sensors, devices, and subsystems can be coupled to peripherals interface 206 to facilitate multiple functionalities. For example, motion sensor 210, light sensor 212, and proximity sensor 214 can be coupled to peripherals interface 206 to facilitate orientation, lighting, and proximity functions of a device using architecture 200. Location processor 215 (e.g., a GPS receiver) can be connected to peripherals interface 206 to provide geo-positioning. Electronic magnetometer 216 (e.g., an integrated circuit chip) can also be connected to peripherals interface 206 to provide data that can be used to determine the direction of magnetic North. Thus, electronic magnetometer 216 can be used as an electronic compass. Accelerometer 217 can also be connected to peripherals interface 206 to provide data that can be used to determine change of speed and direction of movement of a device using architecture 200.

Camera subsystem 220 and an optical sensor 222, e.g., a charged coupled device (CCD) or a complementary metal-oxide semiconductor (CMOS) optical sensor, can be utilized to facilitate camera functions, such as recording images and video clips.

Communication functions can be facilitated through one or more wireless communication subsystems 224, which can include radio frequency receivers and transmitters (e.g., transceivers) and/or optical (e.g., infrared) receivers and transmitters (e.g., transceivers). The specific design and implementation of communication subsystem 224 can depend on the communication network(s) over which a device using architecture 200 is intended to operate. For example, a device can include communication subsystems 224 designed to operate over a GSM network, a GPRS network, an EDGE network, a WiFi or WiMax network, a Bluetooth network, and/or any combination of the foregoing. Wireless communication subsystems 224 can include hosting protocols such that a device using architecture 200 can be configured as a base station for other wireless devices.

Audio subsystem 226 can be coupled to a speaker 228 and a microphone 230 to facilitate voice-enabled functions, such as voice recognition, voice replication, digital recording, and telephony functions.

I/O subsystem 240 can include display device controller 242 and/or other input controller(s) 244. Display device controller 242 can be coupled to a display device 246. In one aspect, display device 246 is a touch screen and display device controller 242 is a touch screen controller. Display device 246 and display device controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with display device 246.

Other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of speaker 228 and/or microphone 230.

Memory interface 202 can be coupled to memory 250. Memory 250 is an example of a computer readable storage medium. Memory 250 can include high-speed random access memory (e.g., volatile memory) and/or non-volatile memory, such as one or more magnetic disk storage devices, one or more optical storage devices, and/or flash memory (e.g., NAND, NOR). Memory 250 can store operating system 252, such as LINUX, UNIX, a mobile operating system, an embedded operating system, etc. Operating system 252 may include instructions for handling basic system services and for performing hardware dependent tasks. In some implementations, operating system 252 can include a kernel.

Memory 250 may also store other program code 254 such as communication instructions to facilitate communicating with one or more additional devices, one or more computers and/or one or more servers; graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; Web browsing instructions to facilitate Web browsing-related processes and functions; media processing instructions to facilitate media processing-related processes and functions; GPS/Navigation instructions to facilitate GPS and navigation-related processes and functions; and camera instructions to facilitate camera-related processes and functions.

Memory 250 may also store request control program code 256 to facilitate coordination and handling of communication sessions as described herein. For example, request control program code 256 can facilitate the generation and sending of requests for communication sessions, replies to requests, scheduling of communication sessions, and various other operations described herein relating to the scheduling and handling of communication sessions. In one embodiment, processor(s) 204, in executing request control program code 256, implements a synchronous communication unit. Memory 250 further can include calendar program code 258 to facilitate task management, reminder, calendar, and scheduling functions; contacts program code 260 to facilitate contact management; and one or more other application(s) 262. Other program code (not shown) may be included to facilitate security functions, Web video functions, and so forth.

Each of the above identified instructions and applications can correspond to a set of instructions for performing one or more functions described above. These instructions need not be implemented as separate software programs, procedures, or modules. Memory 250 can include additional instructions or fewer instructions. Furthermore, various functions of architecture 200 may be implemented in hardware and/or in software, including in one or more signal processing and/or application specific integrated circuits.

Program code stored within memory 250 and any data items used, generated, and/or operated upon by a device utilizing an architecture the same as or similar to that of architecture 200, e.g., requests, replies, metadata items, calendar events, reminders, and so forth, are functional data structures that impart functionality when employed as part of such system or device. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Architecture 200 may include fewer components than shown or additional components not illustrated in FIG. 2 depending upon the particular type of device that is implemented. In addition, the particular operating system and/or application(s) and/or other program code included may also vary according to device type. Further, one or more of the illustrative components may be incorporated into, or otherwise form a portion of, another component. For example, a processor may include at least some memory.

Figure 3:
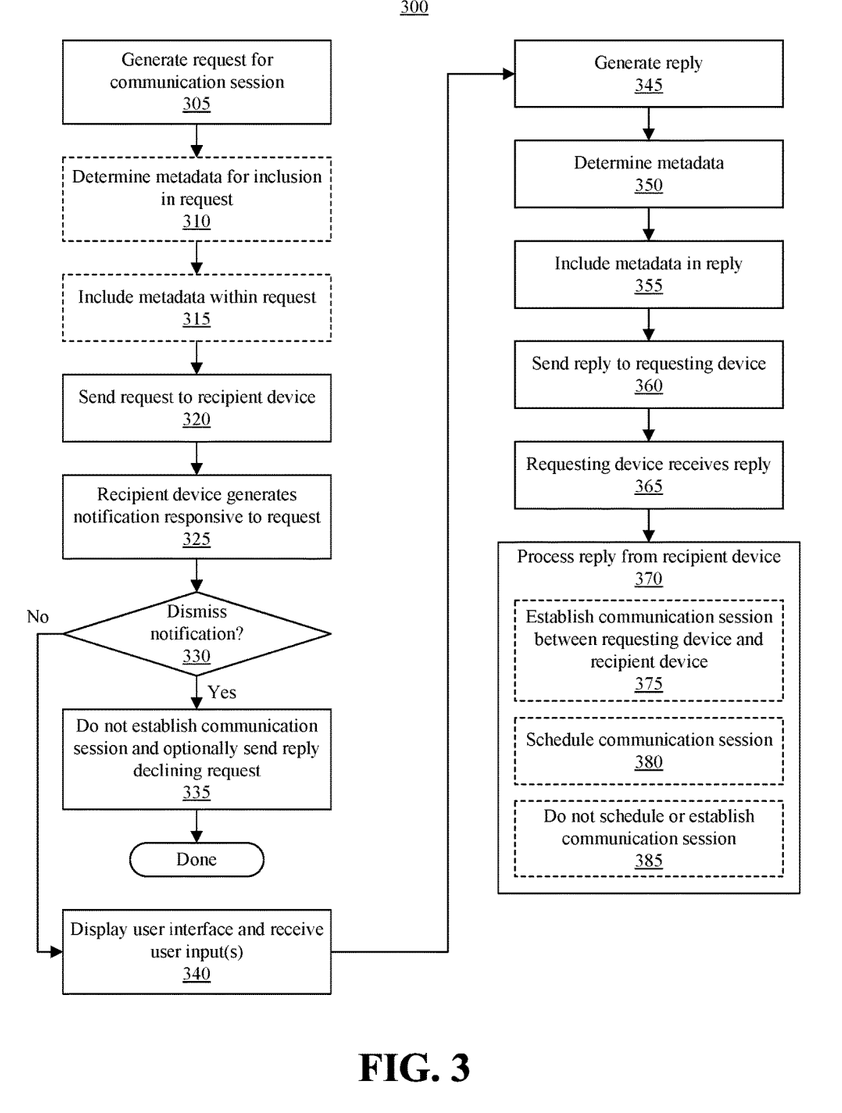
FIG. 3 is an example method of coordinating and handling communication sessions among a plurality of devices.

FIG. 3 is an example of a method 300 of coordinating and handling communication sessions among a plurality of devices. Operations described in connection with method 300 may be performed by one or more of the devices described with reference to FIG. 1. Method 300 illustrates a method of providing an explicit request mechanism for a communication session that is integrated directly into the device, e.g., the call, user experience. For example, the operations described herein may be initiated from within a call user interface, whether for the requesting device or the receiving device.

In block 305, a requesting device generates a request for a communication session. In one embodiment, rather than immediately initiating a communication session, a user of a requesting device (a "requesting user") may choose to send a request to another user, e.g., a recipient user. For example, in response to a user input requesting generation of a request for a communication session, the requesting device is capable of generating a request for the communication session that may be sent to another device referred to as the recipient device. The requesting user may specify particular data items that are included in the request such as identifying information for the recipient of the request, and so forth.

It should be appreciated that the terms "recipient user" and "recipient device" may be used interchangeably within this disclosure from time to time. Similarly, the terms "requesting user" and "requesting device" may be used interchangeably within this disclosure from time to time. In this regard, the sending of a request or a reply to a particular user means that the request or reply is being sent to a device of that user. In some cases, the request or reply is directed to a particular device, e.g., a mobile phone when using a phone number. In other cases, the request or reply is sent to a device with which a user has logged into a communication service, e.g., in the case of Internet-based calls and/or communications. As such, the terms "recipient device" and "requesting device" may refer to such devices.

In block 310, the requesting device optionally determines metadata for inclusion in the request. In one embodiment, any metadata to be included in the request may be manually specified by the requesting user. In one example, the requesting device is capable of presenting a user interface through which the requesting user specifies one or more items of metadata that are included in the request. In another embodiment, the requesting device is capable of determining one or more items of metadata automatically and including the metadata within the request.

Example items of metadata that may be included in the request include, but are not limited to:
  Identity or address of the requesting user such as a phone number, username, electronic mail address, etc.;
  Purpose or topic for the communication session;
  Estimated duration of the communication session;
  Urgency of the communication session being requested;
  Proposed or future time(s) to initiate and/or establish the communication session;
  Availability for the communication session;
  Image(s), video(s), and/or audio message(s) (e.g., recordings);
  Location of the requesting user (whether specified manually by the user or detected automatically by the requesting device);
  Deadline for conducting the communication session (e.g., the requestor needs to communicate prior to a particular time that day or another day);
  Identity or address of one or more other potential participants for the communication session;
  A communication channel, e.g., an alternate communication channel, to be used for establishing the communication session and/or any necessary identities, addresses, or credentials for such communication channel(s);

Who (e.g., which device) should initiate the communication session;

A timeout for the request indicating when the request is automatically canceled or terminated; and A conference identifier and/or password if the communication session is a conference call.

For purposes of illustration, urgency may be specified as a binary value (e.g., either urgent or not) or as a relative priority from a numerical scale etc. Similarly, duration may be specified in relative terms such as "a few seconds," "a few minutes," or "it will take a while," or in absolute terms such as a particular number of seconds, minutes, and/or hours. Location of the requesting user (e.g., the requesting device) may be communicated or specified at any of a variety of possible levels of granularity. In one example, the location of the requesting user may be specified using coordinates. In another example, the location may be specified as a city, a state, a country, etc.

The future availability of the requesting user may be manually specified by the requesting user using the user interface or automatically determined by the requesting device. For example, the requesting device is capable of determining the future availability of the requesting user by interacting with a calendar application and/or calendar data stored thereon or accessible by the requesting device for the requesting user and automatically populating the availability into the request as metadata. In another example, the requesting device is capable of determining a deadline for the communication session from the calendar data of the requesting user by detecting a next event scheduled in the requesting user's calendar and using that date and/or time (or some time prior to the detected event) as a deadline for the communication session. Further, availability of the requesting user may be specified as absolute values (e.g., busy or free), as relative values; as preferred time(s) and/or time ranges where the time(s) and/or time range(s) have values indicating preference.

In one embodiment, a timeout may be manually specified by the requesting user when creating the request. In another embodiment, the timeout may be determined automatically by the requesting device. In one example, the requesting device uses a default value for the timeout such as 60 minutes, etc. In another example, the requesting device may automatically determine the timeout from the requesting user's calendar data. For instance, the requesting device may determine an adaptive timeout value so that the request times out at or about or prior to the requesting user's next appointment in the calendar data. As an illustrative example, if the expected duration of the communication session being requested is 20 minutes and the next scheduled appointment for the requesting user is at 2:00 PM, the requesting device may set the request to expire (e.g., have a timeout) no later than 1:40 PM, where the timeout is determined based upon the time of the next scheduled appointment and the expected duration of the communication session. Alternatively, the request may be set to timeout at or about 2:00 PM.

As defined within this disclosure, the term "communication channel" means a particular communication technology where each communication channel utilizes a different combination of one or more of a particular communication medium, application, infrastructure, communication protocol, etc. Examples of different communication channels include, but are not limited to, Internet based (e.g., WiFi) voice call, Internet based (e.g., WiFi) video call, a mobile phone call over the mobile phone network, and so forth. Within a given technology, each different application may also be considered a different communication channel where one vendor's proprietary or open platform (e.g., Internet based audio and/or video calls) is considered a different communication channel than another vendor's proprietary or open platform.

In one or more other embodiments, the requesting device is capable of automatically adding additional metadata to the request based on initial metadata explicitly provided by the requesting user. For example, the requesting device is capable of determining and adding a deadline (e.g., a timeout) to a call request based on matching the purposes or topic of the communication session provided by the requesting user to calendar data stored on the requesting device. In another example, a requesting user may provide information from other contexts to add to the metadata of a request. For instance, the requesting user may share an electronic mail message within the request thereby allowing the requesting device to assign the sender of the electronic mail message as a recipient of the request and use the topic of the electronic mail message as the topic for the request. In one embodiment, the "Share Intent" functionality within an operating system that facilitates the sharing of data among different applications may be used. In another example, if a communication session (e.g., a call) is associated with a scheduled meeting, the recipient device is capable of automatically adding the meeting name as the topic for the request.

In block 315, the requesting device includes metadata relating to the communication session within the request. As illustrated in FIG. 3, blocks 310 and 315 are optional. Accordingly, in another embodiment, responsive to the initiation of a request, the requesting device is capable of sending the request to a specified recipient user immediately without the inclusion of metadata. In that case, the request may be directed to the recipient user. The requesting device may or may not prompt the requesting user to provide additional data that may aid the recipient user in determining whether to accept the request, ignore the request, suggest an alternate time, etc.

In block 320, the requesting device sends the request to the recipient device. In one embodiment, the requesting device is capable of sending the request to the recipient device prior to the establishment of a communication session with the recipient device. For example, the requesting user may specify the request before initiating the communication session. In another embodiment, the requesting device is capable of sending the request to the recipient device as part of initiating the communication session with the recipient device. For example, the requesting device may send the request to the recipient device as part of the process of initiating the communication session or once the communication session is initiated but prior to the recipient user answering the communication session (e.g., answering a call, going "off-hook," picking-up, or other analog thereof). As an illustrative example, the requesting device may send the request while the requesting user is still waiting for the recipient user to answer or "pick-up" to establish the voice or video connection.

In block 325, the recipient device generates a notification responsive to the received request. For example, the recipient device displays a notification of the request. The notification may include the requesting user's identity and any additional metadata included in the request.

In block 330, the recipient device determines whether the notification is dismissed. In one aspect, for example, the recipient user may select the notification to obtain further options for responding to the request. In that case, method 300 may continue to block 340. If the recipient user dismisses or ignores the notification, method 300 may proceed to block 335. In one example, a swiping away of the notification action is interpreted by the recipient device as a "hard no" or declination of the request. In that case, in block 335, the recipient device ignores or dismisses the notification. The recipient device is also capable of sending a reply to the requesting device declining the request. In another aspect, dismissing, e.g., swiping away, the request may be a "soft no" that hides the notification on the recipient device in block 335. In that case, the request may timeout on the recipient device. In any case, the communication session is not established in block 335.

In block 340, the recipient device is capable of displaying a user interface. For example, the recipient user may select the notification thereby causing the recipient device to generate and/or display a user interface. Further, the recipient device is capable of receiving one or more user inputs through the user interface. The recipient user may choose one or more different options for responding to the request using the user interface. In one or more other embodiments, the notification of block 325 may include shortcuts or controls for the recipient user to act directly on the notification in lieu of, or in combination with, the presentation of a user interface in block 340.

In block 345, the recipient device generates the reply. In block 350, the recipient device determines metadata. Examples of metadata that may be determined by the recipient device include, but are not limited to:
  Acceptance (accept or decline) of the request;
  Alternate proposed or future time(s) to initiate and/or establish the communication session;
  Availability for the communication session
  Image(s), video(s), and/or audio message(s) (e.g., recordings);
  Location of the recipient user (whether specified manually by the user or detected automatically by the recipient device);
  A communication channel, e.g., an alternate communication channel, to be used for establishing the communication session and/or any necessary identities, addresses, or credentials for such communication channel(s); and
  Who (e.g., which device) should initiate the communication session.

In one embodiment, the recipient device determines metadata for inclusion in a reply to be generated and sent to the requesting device. The recipient device is capable of determining one or more items of metadata based upon inputs received from the recipient user. The recipient device is further capable of determining one or more items of metadata automatically.

In another embodiment, the recipient user may indicate an acceptance of the request where the request is for an immediate communication session as opposed to a communication session scheduled at a future time. In that case, the recipient device is capable of initiating the communication session with the requesting device as opposed to first generating a reply to be sent to the requesting device or generating any reply at all.

In another aspect, the particular device that initiates the communication session may be determined based upon the received request if such information is specified as part of the metadata therein. For example, responsive to an acceptance of the request and the request indicating that the recipient device is to initiate, the recipient device may initiate the communication session without sending a reply. If the request indicates that the requesting device is to initiate, the recipient device can send the reply with acceptance. In that case, responsive to the reply, the requesting device initiates the communication session.

Further, regardless of the device that initiates the communication session (e.g., where no communication session is yet established or started), the communication session may be established over a particular communication channel that is selected from a plurality of different communication channels. The communication channel may be specified as part of the metadata of the request or specified in metadata in the reply.

In one embodiment, as metadata is determined for the reply, the recipient device is also capable of scheduling the communication session for a later time. In one example, the recipient device is capable of generating a reminder for the communication session on the recipient device to establish the communication session at a future or proposed time. In another example, the recipient device is capable of generating a calendar event for the communication session on the recipient device for the communication session at a future or proposed time. Alternatively, the recipient device may generate a shortcut that, when selected by the recipient user, causes the generation of such a reminder.

The term "scheduling," as defined herein, means creating a reminder for a communication session, creating a calendar event for a communication session, and/or initiating the communication session within either one or both of the requesting device and/or the recipient device. In scheduling a calendar event and/or a reminder, the device may also first query the user as to whether the programmatic action is to be performed. The term "reminder," as used herein, means a data structure that causes a device to generate a notification at a particular time or responsive to detecting conditions, e.g., defined within the reminder. The reminder may cause the presentation of a user interface having one or more selectable controls, e.g., to initiate a communication session, or the like.

In another embodiment, the recipient device may include an instruction or a reminder object within the reply (e.g., as part of the metadata) that causes the requesting device to create a reminder to initiate the communication session at a particular time. Alternatively, the metadata may include instructions causing the requesting device to display a shortcut that, when selected by the requesting user, causes the requesting device to create such a reminder.

In block 355, the recipient device is capable of including any metadata determined by the recipient device within the reply. In block 360, the recipient device sends the reply to the requesting device. In block 365, the requesting device receives the reply.

In block 370, the requesting device processes the reply from the recipient device. In one aspect, in the case where the reply from the recipient device indicates acceptance and immediate availability for the communication session, the requesting device establishes the communication session between the requesting device and the recipient device in block 375.

In another aspect, where the reply indicates acceptance but not immediate availability for the communication session, the requesting device is capable of scheduling the communication session for a later time in block 380. Scheduling, as noted, may include creating a reminder for the communication session, creating a calendar event for the communication session, initiating the communication session, and so forth within either one or both of the requesting device and/or the recipient device.

In scheduling a communication session, the particular communication channel to be used may be determined as described herein. In one or more other embodiments, a device, whether the requesting device or the recipient device may store associations of users (e.g., contacts) with a preferred communication channel that may be used to establish communication sessions with that user when implementing the various embodiments and/or examples described herein. In another embodiment, the particular communication channel used may be one that has been used commonly or more than others based upon historical communication sessions between the recipient user (or recipient device) and the requesting user (or requesting device).

In another embodiment, a request and/or response may include device capabilities in the metadata. For example, a request or a reply may indicate that a device has only WiFi capability and no mobile phone connectivity. In that case, a device receiving and processing the request or reply may propose a communication channel that is operable using the available capabilities of the device. In this example, the device processing the request or reply may suggest an Internet based call as opposed to a mobile phone call so that the device with only WiFi capability may participate.

In block 385, the requesting device does not schedule a communication session or initiate a communication session. For example, block 385 may be implemented responsive to a reply from the recipient device indicating that the request has been declined.

FIGS. 4-9 are user interface examples that illustrate how the request and/or reply mechanisms described herein can be integrated into the communication session user experience. The integration relieves a user from attempting to schedule a communication session using a different communication channel such as texting or electronic mail.

Figure 4:
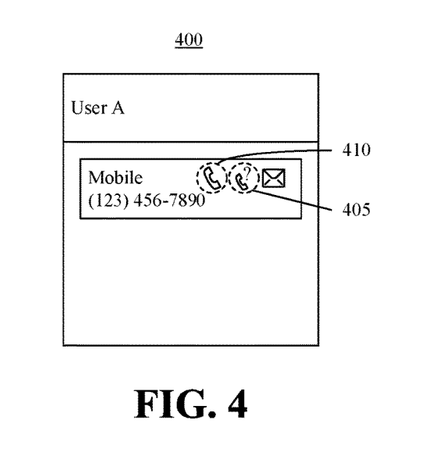
FIG. 4 is an example user interface for sending a request for a communication session.

FIG. 4 is an example user interface 400 for sending a request for a communication session. User interface 400 may be incorporated into a contact application or into a phone application on a device. In the example of FIG. 4, a contact record for "User A" is shown. As part of the contact record, a control 405 is provided in addition to other conventional controls for initiating calls. Responsive to a user selection of control 405, the device generating user interface 400, e.g., the requesting device, generates a request for a communication session as opposed to initiating a call or other communication session directly with User A or sending User A another type of message such as an electronic mail message or an instant message.

In another embodiment, user interface 400 may exclude control 405. In that case, control 410 may function as a multi-purpose control. For example, when control 410 is selected, the requesting device is capable of initiating a phone call to the selected contact or telephone number. Responsive to a user pressing or touching control 410 for a longer duration or extended amount of time, e.g., at least a minimum amount of time, the requesting device may generate a request and/or generate a user interface to receive metadata for inclusion within the request.

Figure 5:
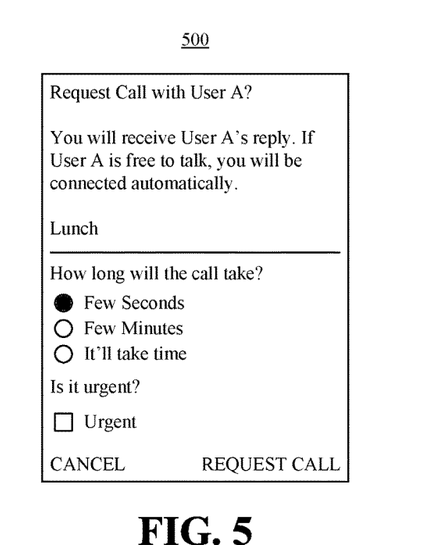
FIG. 5 is another example of a user interface for specifying metadata to be included within a request for a communication session.

FIG. 5 is another example of a user interface 500 for specifying metadata to be included within a request for a communication session. In the example of FIG. 5, user interface 500 permits the requesting user to manually specify one or more items of metadata such as the duration of the requested communication session and whether the request is urgent. User interface 500 illustrates an example where the communication session is a mobile phone call. In one embodiment, user interface 500 may be displayed by the requesting device in response to a selection of control 405 of FIG. 4. The subject or topic of the communication session is shown as "Lunch". The topic may be manually entered by the requesting user or may be determined automatically by the requesting device by accessing calendar data, historical communications, and the like with the recipient user.

Figure 6:
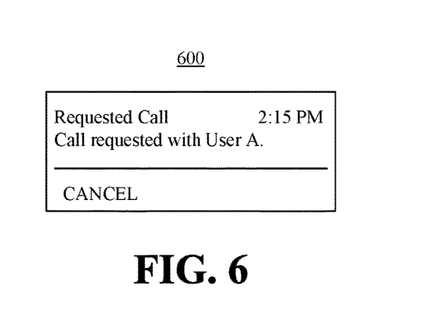
FIG. 6 is another example user interface for showing an outstanding request for a communication session.

FIG. 6 is another example user interface 600 for showing an outstanding request for a communication session. User interface 600 may be displayed on the requesting device to indicate that an outstanding request for a communication session still exists, e.g., has not timed out, been canceled, or been declined. In one aspect, user interface 600 may be displayed as part of, or within, a notification center of the requesting device. User interface 600 indicates the recipient user to whom the request is directed and the time and/or date that the request was issued. While FIG. 6 illustrates a single outstanding request, in one or more other embodiments, user interface 600 may present a list of a plurality of outstanding requests.

For example, once the requesting device sends the request, the requesting device is capable of providing a persistent indication that an outstanding requests exists. The requesting device may maintain a queue of outstanding requests. FIG. 6 is an example implementation of the persistent indication. In the event that the requesting user wishes to terminate or cancel the request, the requesting user may select the "CANCEL" control in user interface 600, thereby causing the requesting device to cancel the outstanding request.

In one or more embodiments, responsive to a communication session between the requesting device and the recipient device being established, display of user interface 600 may be discontinued or stopped, e.g., user interface 600 disappears. In one example, in the case where user interface 600 includes one outstanding request corresponding to the communication session that is established, display of user interface 600 is discontinued. In another example, display of user interface 600 is discontinued responsive to a communication session being established that corresponds to any outstanding request shown within user interface 600. In one or more other embodiments, the display of user interface 600 may continue and only the request corresponding to the established communication session may be removed until the user dismisses user interface 600.

In one or more other embodiments, the requesting user may attempt to call a user that is the subject of an outstanding request (e.g., call a recipient user). The requesting device is capable of detecting a call or other form of communication to such a user based upon the stored outstanding requests. In one example, the requesting device is capable of copying the outstanding request data into the call. In another example, the recipient device is capable of querying the requesting user whether the requesting user wishes to update the request information prior to including the request information within the call. If the recipient user chooses to update the request data, the recipient device receives the updated data and/or automatically updates data such as calendar data, and then copies the updated request data into the call. In still another example, the recipient device is capable of querying the requesting user whether to cancel the outstanding request for the recipient user and then initiate the call or automatically cancel the outstanding request responsive to detecting the call.

While FIG. 6 illustrates one example of removing or terminating a request for a communication session, requests may be terminated using other techniques. In one embodiment, the requesting device may terminate an outstanding request responsive to detecting communication between the recipient user (or recipient device) and the requesting user (or requesting device). The detected communication may be via the original communication channel intended or specified by the request or by a reply or via another different or alternative communication channel. For example, the requesting device may cancel or terminate a request for a phone call responsive to detecting a phone call with the recipient device or responsive to detecting an instant message, electronic mail, etc. to or from the recipient user.

In another embodiment, the recipient device may cancel or terminate a request for a communication session upon expiration of a timeout period associated with the request or responsive to any deadline for conducting the communication session having passed or otherwise expiring.

In still another embodiment, in addition to canceling a request, devices are capable of updating metadata within a request and/or a reply. For example, responsive to a user's availability for a future communication session changing before the request times out, is accepted, declined, or otherwise acted upon, the requesting device may update the metadata in the request and provide the updated request or updated metadata to the recipient device. The recipient device may update the request as displayed therein to show the updated metadata. Similarly, a recipient device may update metadata of a reply and provide the updated reply and/or updated metadata to the requesting device. The requesting device may act on the updated reply and/or updated metadata.

Figure 7:
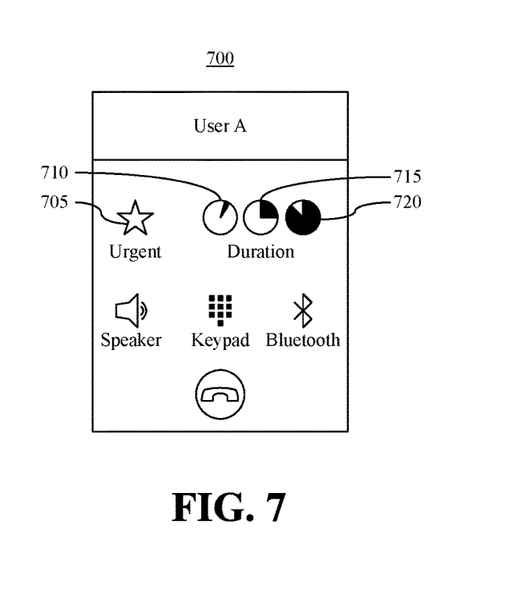
FIG. 7 is another example user interface for generating a request for a communication session.

FIG. 7 is another example user interface 700 for generating a request for a communication session. The example of FIG. 7 illustrates an embodiment where controls for specifying metadata of the request are incorporated into user interface 700, which is generated by a phone application. In the example of FIG. 7, a requesting user has initiated a communication session, in this case a phone call, to a recipient (User A). As the requesting device rings the recipient device and prior to the recipient device answering the phone call, the requesting user may select controls such as control 705 to indicate that the call is urgent, controls 710, 715, or 720 to indicate the expected duration of the call, etc. Any metadata determined by selection of controls 705, 710, 715, or 720 may be propagated to the recipient device and displayed as the recipient device rings thereby allowing the recipient user to utilize the metadata in determining whether to pick up or answer the incoming phone call. Thus, while waiting for a call to connect, the requesting device may present controls as shown to allow the requesting user to quickly specify the noted metadata.

It should be appreciated that the particular controls illustrated in FIG. 7 and within the various example user interfaces here are for purposes of illustration only. Further controls may be provided to facilitate a requesting user to specify any of the various items of metadata described herein for inclusion within a request.

Figure 8:
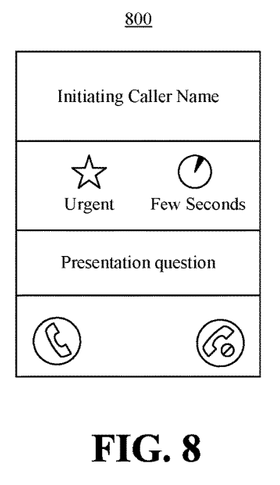
FIG. 8 is another example user interface for displaying a request for a communication session on a recipient device.

FIG. 8 is another example user interface 800 for displaying a request for a communication session on a recipient device. In one embodiment, user interface 800 is used by a recipient device to display metadata for a request that is received from a requesting device. For example, responsive to a user using a requesting device to indicate a duration for a call, whether the call is urgent, and a subject for the call (e.g., using user interface 700 of FIG. 7), user interface 800 may be generated and displayed by the recipient device. User interface 800 shows that the anticipated call is not urgent, is expected to last only a few seconds, and is about a "presentation question." The metadata displayed in user interface 800 is presented seamlessly within the phone application user interface and aids the recipient user in determining whether to answer the phone call. As shown, the metadata is propagated from the requesting device to the recipient device prior to the recipient device answering the incoming phone call (e.g., going "off hook") which establishes the audio and/or video connection.

In another embodiment, additional metadata determined on the recipient device may also be displayed on the recipient device. The additional metadata provides further context for the incoming request and/or communication session. For example, the recipient device may display upcoming meetings where the requesting user is a participant with the recipient user, display recent communications to and/or from the requesting user (e.g., electronic mail, instant messages, etc.), display recent social media updates (e.g., Twitter®, Facebook®) from the requesting user, and so forth. The additional context helps to personalize the content of the request for the recipient user based upon additional information either within the recipient device or additional information that is accessible to the recipient device.

In one or more embodiments, the recipient device is capable of determining how to notify the recipient user of the incoming communication session or incoming request based upon metadata. The recipient device is capable of choosing one or more of a plurality of different modalities (e.g., ringing, choosing a particular ringtone, vibrating, etc.) based upon the metadata received from the requesting device. The recipient device may use both audio and vibration for incoming requests and/or communication sessions marked as urgent. A different modality such as only audio or only vibration may be used for incoming communication sessions and/or requests marked as non-urgent. Other modalities may include flashing an LED, flashing the camera flash, using edge display where curved edges of a display of a device are illuminated or activated to communicate information about incoming calls or other notifications, and so forth. In other example, the intensity of the modality may be adjusted based upon metadata. For example, the volume of an audio notification (ringer) or the brightness of a visual indication (LED, flash, etc.) may be adjusted according to metadata where higher volumes (brighter visual indications) are correlated to greater urgency or importance. In another example, where visual indications are used, a particular pattern of blinking or pattern/sequence of colors may be used to indicate particular items of metadata.

Because users can add metadata after initiating a communication session, the receiving device (and the network) can modify how an incoming communication session is handled in the case where additional metadata becomes available. For example, if a requesting user initiates a call without adding metadata, the recipient device may only play an audio notification responsive to the incoming call. If the requesting user subsequently indicates that the call is urgent, e.g., while the recipient device is ringing, the recipient device, in response to receiving the metadata, may add vibration to the call notification. Similarly, the network may allow the call to ring for a longer period of time. In this regard, additional metadata may be used to influence handling of an incoming communication session. For example, an urgent call may be permitted to ring longer before being sent to voicemail.

In one or more embodiments metadata may be used by a recipient device to augment notifications of missed calls. In one example, the recipient device is capable of including the metadata in the notification of the missed call. In another example, the recipient device is capable of generating a text message or a request (for a call or communication session) on the recipient device. If the additional data arrives after a noticeable amount of time has elapsed and, for example, the recipient user has declined the call, the receiving device is capable of issuing a separate notification to communicate the availability of additional data associated with the previous declined call.

In one or more embodiments where the requesting device terminates an initiated communication session before the recipient device picks up or answers, the requesting device is capable of automatically generating a request and sending the request to the recipient device. In one example, this functionality may be "opt-in" in that the recipient device may first query the user as to whether to generate and send the request. Any metadata specified in the terminated call may be used automatically within the generated request.

In one or more other embodiments, in the case where the requesting device cancels a communication session without creating a follow-up request and the requesting user subsequently initiates a call to the same recipient user again, the requesting device is capable of automatically setting particular metadata. For example, if the requesting device terminates a call that is unanswered by the recipient device and, within some pre-defined amount of time, initiates a further call to the same recipient, the requesting device may automatically mark the call as urgent. In another embodiment, the requesting device is capable of prompting the requesting user whether to mark the call as urgent or set some other item(s) of metadata.

Figure 9:
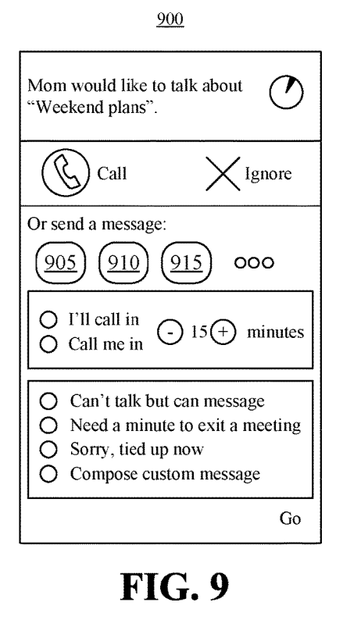
FIG. 9 is another example user interface for displaying a request for a communication session on a recipient device.

FIG. 9 is another example user interface 900 for displaying a request for a communication session on a recipient device. In the example of FIG. 9, a recipient device, having received a request, displays user interface 900. User interface 900 allows the recipient user to respond to the incoming request in any of a variety of different ways. In the example shown, a user has received a request from "Mom" to discuss "Weekend plans."

As illustrated, the recipient user may select the "call" control or the "ignore" control to process the request. Alternatively, the recipient user may choose to respond to the request with a message by selecting one of icons 905, 910, or 915, where each icon selects a particular application to be used to respond with the message. For example, icon 905, may execute a messaging or texting application and create a new message to the requesting user. Icon 910 may create an electronic mail addressed to the requesting user. In one or more embodiments, the icons that are displayed by a device are personalized based upon the identity of the user. For example, one or more of the icons of FIG. 9 can be personalized based upon identity of the requesting user. The recipient user may select the "I'll call in" option or the "Call me in" option. The "I'll call in" option creates metadata within a reply that the recipient device will call. The "Call me in" option creates metadata within a reply indicating that the requesting user should initiate the communication session. In this example, the recipient user may specify an amount of time that is included in the metadata.

In one aspect, depending upon which device is to initiate the communication session, a reminder may be created that is triggered in the amount of time specified. For example, in the case where the "I'll call in" option is selected, the recipient device is capable of creating a reminder that is triggered in the specified amount of time, e.g., in 15 minutes. The user may adjust the time using the "+" and/or "−" icon controls in FIG. 9. In the case where the "Call me in" option is selected, the recipient device may send a reply to the requesting device. The requesting device, in response to the reply, is capable of creating a reminder to call the recipient user in the specified amount of time. Alternatively, the recipient user may simply choose a predetermined response or choose to compose a custom message to reply to the request.

In one or more other embodiments, the recipient device is capable of personalizing messages from which the recipient user may choose in generating a reply to a received request. For purposes of illustration, messages such "Can't talk but can message" or "Need a minute to exit a meeting" and so forth, as presented in user interface 900, may be automatically determined by the recipient device. For example, the recipient device is capable of automatically selecting messages for inclusion in user interface 900 based upon prior selections of messages selected or composed by the recipient user for responses, frequent selections of messages by the recipient user for responses, recent messages included in responses from the recipient user, and so forth.

In the example of FIG. 9, alternate times may be proposed in fixed time increments (e.g., 5 minutes or 15 minutes). In other embodiments, the alternate time may be specified as an arbitrary numeric value. In yet another embodiment, the recipient device is capable of automatically determining a likely alternate time based on information available on the recipient device (e.g., calendar data). If a received request includes metadata indicating availability of the requesting user, the recipient device is capable of displaying those available times from the request and allowing the recipient user to select one of the times. The selected time may be used to schedule the communication session in one or both devices. In a further example, the recipient device may filter the list of possible times by removing or not displaying those times for which the calendar data for the recipient user indicates unavailability.

In one or more embodiments, the request and reply framework described herein may be used to arrange communication sessions with more than two persons. For example, a user may send a request to multiple other users to schedule a conference call. Rather than supporting immediately initiating a call, the request may solicit possible times. The requesting device could identify the best possible time among the returned responses and schedule the call on each of the recipient devices.

In one or more embodiments, the request/reply framework described herein may be utilized in the context of call recovery. As an illustrative example, if a user is dropped from a communication session (e.g., a call) prematurely, a device of the user that was dropped may initiate a request to the other device automatically. For instance, responsive to losing a connection during an ongoing communication session, the device that loses the connection may automatically generate a request and send the request to the other participant(s) of the dropped communication session responsive to regaining the connection.

In another embodiment, either the requesting device or the recipient device is capable of sending the other device a call request with metadata indicating an alternative communication channel (e.g., an alternative communication application). For example, the device that loses communication with a particular communication server is capable of sending a request to the other device indicating an alternative communication application or can initiate a communication session directly using the alternative communication application. Determination of the alternative communication application can be based on one or more of user history, aggregated usage data of the network in the region, testing the network, and so forth. This functionality can serve to facilitate communications in regions that provide varying quality of service for different communication applications.

It should be appreciated that the example embodiments described herein may be applied to phone calls and to other forms of synchronous communication, e.g., Internet based, to mimic the user experience of making a phone call. The requesting user can start a communication session as a call to the recipient user with or without specifying metadata. The requesting device is capable of sending a request to the recipient device using an asynchronous channel (e.g., a proprietary cloud-based push messaging service or an existing commercial asynchronous messaging service). The recipient device is capable of displaying the request as though the request is an active incoming call. For example, the recipient device is capable of displaying a full screen user interface with accept and/or ignore controls. If the recipient user accepts, the recipient device is capable of initiating a communication session to the requesting device. Alternatively, the recipient device is capable of sending an asynchronous reply to the requesting device instructing the requesting device to initiate the communication session to the recipient device.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory, as described herein, is an example of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment. The terms "embodiment" and "arrangement" are used interchangeably within this disclosure.

As defined herein, the term "output" means storing in physical memory, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of communication, comprising:
    sending, from a requesting device to a recipient device prior to establishing a communication session with the recipient device, a request for the communication session, wherein the request includes metadata including a timeout indicating when the request is automatically canceled;
    automatically determining the timeout based on calendar information for the requesting device;
    receiving, within the requesting device, a reply to the request from the recipient device;
    responsive to the reply, scheduling the communication session within the requesting device based upon the reply and the timeout; and responsive to the scheduling, automatically initiating by the requesting device the communication session with the recipient device based on the scheduling.

2. The method of claim 1, wherein the request specifies a duration of the communication session.

3. The method of claim 1, wherein the scheduling the communication session comprises creating a reminder to initiate the communication session.

4. The method of claim 3, wherein the reply comprises calendar data from the recipient device and the reminder is scheduled based upon the calendar data.

5. The method of claim 4, wherein the reminder is scheduled based upon calendar data of the requesting device.

6. The method of claim 1, wherein the requesting device is engaged in an ongoing communication session with a device other than the recipient device, the request specifies identifying information for parties on the ongoing communication session, and the recipient device is joined into the ongoing communication session based upon the reply.

7. An apparatus for communication, comprising:
a display device;
a transceiver;
a processor coupled to the display device and the transceiver, wherein the processor is configured to initiate operations comprising:
sending, to a recipient device and prior to establishing a communication session with the recipient device, a request to initiate the communication session, wherein the request includes metadata including a timeout indicating when the request is automatically canceled;
automatically determining the timeout based on calendar information for the requesting device;
receiving a reply to the request from the recipient device;
scheduling the communication session based upon the reply and the timeout; and
automatically initiating by the requesting device the communication session with the recipient device based on the scheduling.

8. The apparatus of claim 7, wherein the request specifies a duration of the communication.

9. The apparatus of claim 7, wherein the scheduling the communication session comprises creating a reminder to initiate the communication session.

10. The apparatus of claim 7, wherein the reply comprises calendar data from the called device and the reminder is scheduled based upon the calendar data.

11. The apparatus of claim 10, wherein the reminder is scheduled based upon calendar data of the requesting device.

12. The apparatus of claim 7, wherein the processor is engaged in an ongoing communication session with a device other than the recipient device, the request specifies identifying information for parties on the ongoing communication session, and the recipient device is joined into the ongoing communication session based upon the reply.

13. A computer program product comprising a computer readable storage medium having program code stored thereon for communication, the program code executable by a processor to perform operations comprising:
sending, from a requesting device to a recipient device prior to establishing a communication session with the recipient device, a request for the communication session, wherein the request includes metadata including a timeout indicating when the request is automatically canceled;
automatically determining the timeout based on calendar information for the requesting device;
receiving, within the requesting device, a reply to the request from the recipient device;
responsive to the reply, scheduling the communication session within the requesting device based upon the reply and the timeout; and
responsive to the scheduling, automatically initiating by the requesting device the communication session with the recipient device based on the scheduling.

14. The computer program product of claim 13, wherein the request specifies a duration of the communication session.

15. The computer program product of claim 13, wherein the scheduling the communication session comprises creating a reminder to initiate the communication session.

16. The computer program product of claim 15, wherein the reply comprises calendar data from the recipient device and the reminder is scheduled based upon the calendar data.

17. The computer program product of claim 13, wherein the requesting device is engaged in an ongoing communication session with a device other than the recipient device, the request specifies identifying information for parties on the ongoing communication session, and the recipient device is joined into the ongoing communication session based upon the reply.

18. An apparatus for communication, comprising:
a display device;
a transceiver;
a processor coupled to the display device and the transceiver, wherein the processor is configured to initiate operations comprising:
receiving, from a requesting device and prior to establishing a communication session with the requesting device, a request to initiate the communication session, wherein the request includes metadata including a timeout indicating when the request is automatically canceled;
wherein the timeout is automatically determined based on calendar information for the requesting device;
receiving a user input indicating a response to the request;
scheduling the communication session based upon the response and the timeout; and
automatically initiating by the requesting device the communication session with the recipient device based on the scheduling.

* * * * *